J. P. HARRISON, Jr.
ADDING AND SUBTRACTING MACHINE.
APPLICATION FILED JULY 21, 1915.

1,319,070.

Patented Oct. 21, 1919.
7 SHEETS—SHEET 1.

Witnesses

Inventor
John P. Harrison Jr.
by Allen & Allen
Attorneys

J. P. HARRISON, Jr.
ADDING AND SUBTRACTING MACHINE.
APPLICATION FILED JULY 21, 1915.

1,319,070.

Patented Oct. 21, 1919.
7 SHEETS—SHEET 2.

Witnesses

Inventor
John P. Harrison Jr
by Allen & Allen
Attorneys

J. P. HARRISON, Jr.
ADDING AND SUBTRACTING MACHINE.
APPLICATION FILED JULY 21, 1915.

1,319,070.

Patented Oct. 21, 1919
7 SHEETS—SHEET 3.

Witnesses

Inventor
John P. Harrison Jr.
by Allen & Allen
Attorneys

J. P. HARRISON, Jr.
ADDING AND SUBTRACTING MACHINE.
APPLICATION FILED JULY 21, 1915.

1,319,070.

Patented Oct. 21, 1919.
7 SHEETS—SHEET 5.

Witnesses

Inventor
John P. Harrison Jr.
by Allen & Allen
Attorneys

UNITED STATES PATENT OFFICE.

JOHN P. HARRISON, JR., OF HAMILTON, OHIO, ASSIGNOR TO THE HARRISON BALANCING MACHINE COMPANY, OF HAMILTON, OHIO, A CORPORATION OF OHIO.

ADDING AND SUBTRACTING MACHINE.

1,319,070.     Specification of Letters Patent.     Patented Oct. 21, 1919.

Application filed July 21, 1915. Serial No. 41,042.

*To all whom it may concern:*

Be it known that I, JOHN P. HARRISON, Jr., a citizen of the United States, and a resident of Hamilton, in the county of Butler and State of Ohio, have invented certain new and useful Improvements in Adding and Subtracting Machines, of which the following is a full, clear, and exact description, reference being had to the accompanying drawings, forming part of this specification.

My invention relates to adding and subtracting machines which have separate positive and negative dials, and is shown as applied to a machine operated by a single stationary and reversible master wheel, working on a horizontal row of reversible counters mounted on a movable carriage and and supplied with a single set of carry devices, same to be actuated by the master wheel.

It will be understood that the master wheel is to be actuated by a set of value keys, and that the carriage is to be moved by a set of order keys. Thus, when say 1000 is to be added, the carriage is to be moved over by the order keys, so that the fourth counter is in mesh with the master wheel, and value key 1 depressed followed by three depressions of 0. It is not my purpose to describe the mechanisms for actuating the master wheel, for printing the amounts of the value keys depressed, or for reversing the motion of the master wheel under actuation of the value keys when subtracting. The theory of the machine to which my invention is applied is to rotate the master wheel against the counters in step by step order, the first counter actuated being controlled by the order keys and the carriage then moving over step by step by being released by the value keys. Dials in mesh with the counters will then note the total of all registrations and printings, and to clear the machine for another calculation, it will be necessary for the operator to print out the total shown on the dials on a reverse movement of the master wheel.

This will give a printed total in a different color from the printed entries, which is the result desired, and the dials will register zero throughout unless some mistake is made, which can be easily remedied, and is brought to the attention of the operator by the fact that his dials are not clear.

A machine for accomplishing these results is described by me in my pending application filed June 18, 1915, Serial No. 34827.

It is the object of this invention to provide for a negative total which is to be presented to the view of the operator by dials on the machine as well as a positive dial. It is further my object to conceal the total which is not the one desired and to do this in an automatic manner. To do this, it is necessary to have two sets of dials, because if one set were present in the type of machine to which my invention is applied, then the operator would have to make a calculation in order to clear the machine were the total below zero, *i. e.* negative. That is to say, if the total were minus 55, the dials would show 9999999945 as the case might be, were there but positive dials in the machine, and the operator would have to add 55 before the machine would be clear. When in such a machine the total negative result was large, then it would be a considerable calculation to clear the machine by returning all dials to zero.

The plan of my invention is to provide two sets of dials both in mesh with common counter pinions, and provide a shutter which will be automatically thrown to cover over the face of the dials not in use. As in my former application, I provide carry mechanism which is shifted when it is desired to subtract so that during my subtraction registration the carry will result in turning the common counters in a reverse direction from when operating in an addition calculation. The numbers on the dials for the negative amounts are in reverse direction to those of the positive dials, in view of the fact that the positive and negative dials both turn in the same direction upon actuation of one of the counter pinions. The pinions are operated in direct or reverse direction by the value keys, by means of a shifting mechanism which forms no part of this invention, but is described in my former application.

When adding, the carry mechanism will operate to move the next adjoining counter pinion one notch direct, and this will turn the adjoining positive dials say from 3 to 4, and the negative set from say 6 to 5. When subtracting, the carry mechanism will reverse the adjoining counter pinion resulting in moving the negative dials say from 5 to 6 and the positive dials from 4 to 3. Whenever adding is being done, the negative dials are running so that the numerals are passing by the reading point in a reverse order, and whenever subtracting is being done the numerals thereon are passing in a direct order.

If the negative dials were at zero throughout and 25 were added into the machine, the tens dial would move to 9 and to 8, showing 8 and the units dial from 9 to 5 showing 5, or a total of 85. When, then, say 47 were to be subtracted, then the tens dial would move away from 8 by the steps 9, 0, 1, 2; and the units dial away from 5 by the steps 6, 7, 8, 9, 0, 1, 2. The tens dial in passing 9 would move the hundreds dial from 0 to 1 and the units dial in passing 9 would move the tens dial from 2, which was left on that dial, to 3, so that the result would be a showing of 132, which is obviously incorrect. It is obvious that means must be provided so that the incorrections owing to faulty carries will be done away with. Accordingly the negative dials at normal are set at 9999999,90 dependent upon how many dials it is desired to have.

Taking then the same calculation,—if 25 is added on to the negative wheels when they stand at this position, the tens dial is moved from 9 to 8 to 7, and the units dial from 0 to 9, 8, 7, 6 and 5, leaving a showing of 9999999975. This is to be covered by a shutter device which prevents a view of the dials, however. When the 47 is subtracted, the tens dial will move to 8, 9, 0 and 1, and the carry mechanism will add one to the 9s, resulting in moving them all to zero. The units dial will move 6, 7, 8, 9, 0, 1 and 2, and in doing so will move the carry mechanism so as to move the tens dial from 1 to 2. The result showing on the negative dials will then be 22, which is correct.

Means are to be provided, when it is necessary, to add ten to the negative dials to make a correct total; to do this, and also other devices which, as the description develops, will be seen to be necessary to maintain a proper balance between the positive and negative dials of the machine. The difficulties of operating two such sets of dials from a common counter are due to the fact that certain adding transactions do not carry, when the subtractions do require it, and owing to the fact that the carry in adding is between 9 and 0 and the borrowing in subtracting is between 0 and 9.

It is thus the object of my invention to provide for two totals, positive or negative, so that a series of numbers may be added and subtracted on dials that will at any time show a proper result for printing in and clearing the machine, and this object I accomplish by that certain construction and arrangement of parts to be hereinafter more specifically pointed out and claimed.

In the drawings,

Fig. 12$^a$ is a detail elevation of one of the carry mechanisms.

Figure 1:
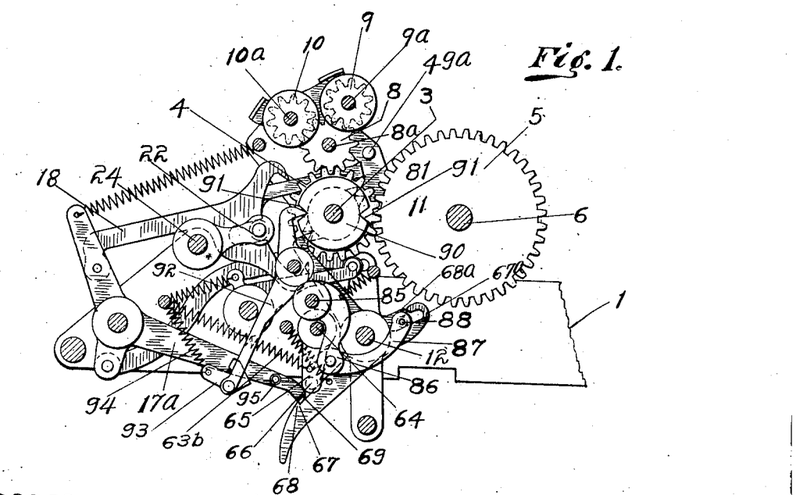
Figure 1 is a right side elevation of the mechanism required.

Mounted across the carriage, which has the lateral members 1 and 2, is the shaft 3 on which is mounted a set of counters 4, nine in number. These counters are positioned on the carriage so that they will be in mesh with the teeth of a master wheel 5, which is stationary and revolves with its shaft 6 (Fig. 1). Mounted across the carriage is a set of idler pinions 8 on shaft 8$^a$, which mesh with two sets of pinions carrying number dials 9 and 10 on their inner faces, said pinions being on shafts 9$^a$ and 10$^a$. The dials 9 are the negative dials and the dials 10 the positive dials, the former having their numerals running clockwise and the latter having their numerals running counter-clockwise. The master wheel for adding is rotated counter-clockwise, and by tracing the steps through the various pinions, it can be seen that the dial pinions will be rotated, when adding counter-clockwise for the negative dials and clockwise for the positive dials.

Figure 12:
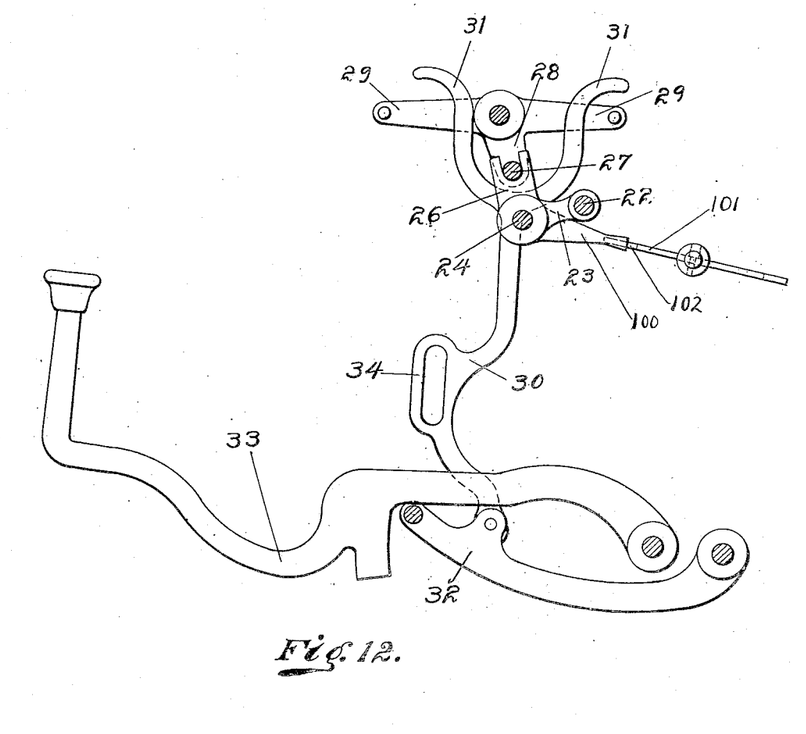
Fig. 12 is a detail elevation of an order key and the connecting mechanism therefor which accomplishes the shifting of the carry mechanism.
Figure 12A:
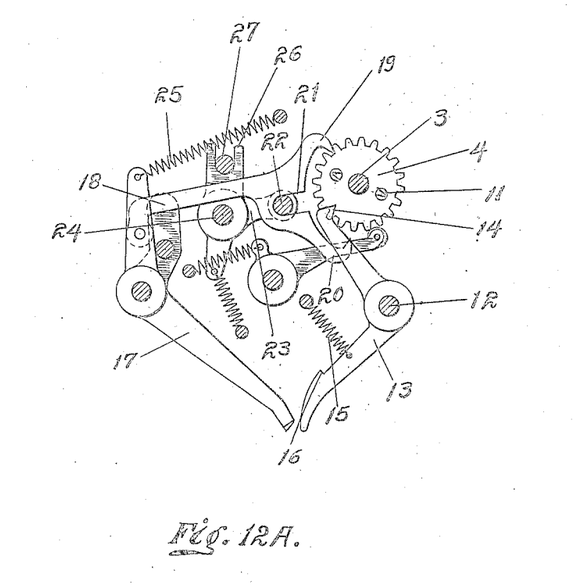

There are twenty teeth on the counters, and ten teeth on the dial pinions. The carry mechanism is different for the first counter of the series as will be explained, but the balance of the carrying devices are the same as in my former application. That is to say, on the inner face of the counter pinions are two teeth 11, spaced ten teeth apart (Fig. 12ª). Mounted on a cross shaft 12 of the carriage are a set of bell cranks 13, each having a toothed end 14, and are held normally in position to be engaged by the teeth on the pinions by springs 15. The other end of the bell cranks is provided with a notch 16 which engages the end of another bell crank 17. These bell cranks have pivotally secured to their other ends the end 18 of forks 19, 20. The top tine of the fork, i. e., 19, is for adding one to the adjacent counter pinion and the lower tine is for subtracting one. The forks have each a slot 21, which engages over a grooved shaft 22, and this shaft is carried by arms 23 fixedly mounted on a rock shaft 24. The bell cranks carrying the forks are spring-held to maintain the forks in engagement with the grooved shaft by means of springs 25, and when the tooth on one of the counter pinions throws out the notched end of the bell cranks 13, and releases the end of the bell cranks 17, then the forks are thrown forwardly, sliding along the grooved shaft, and one of the ends of the forks contacts with the adjacent counter pinion and moves it one notch. The position of the grooved shaft determines whether the upper or lower end of the fork moves the counter and adds or subtracts, the upper being add, and the lower subtract.

This grooved shaft is shifted up or down by means of the rock shaft 24, which has at its left end a fork 26 (Figs. 12 and 12ª), for the purpose of rocking it. This fork engages a pin 27 on a depending member 28 of a rocker 29, and when one end of this rocker is pulled down or the other, then the grooved shaft will be raised or lowered. A member 30 having a hooked fork 31 at its upper end is pivotally mounted on a bail arm 32. This bail arm is controlled by the depression of an order key 33, and such depression will result in pulling down on the hooked fork, and rocking one side or the other of the rocker 29. The subtract key, which is not shown as it forms no part of this invention but is fully described in my former application, operates in a slot 34 in the member 30 to shift it to one side or the other for adding or subtracting, thereby controlling the movement applied to it by the depression of the order key. It should be understood that the order keys are those which move over the carriage preparatory to beginning the registration of a number to be added or subtracted.

*The shutter.*

It will be remembered that in explaining the theory of this invention, it was stated that the negative dials are started at the initial position at 9,999,999,90, and the positive dials at 000000000. It was also stated that this resulted in an incorrect position of the dials for either one or the other set when they were beyond zero in the wrong direction, and that for this and other reasons the set not at the right side of its zero mark would be covered over by a shutter. This shutter is controlled by the end counter pinion on the left side of the machine, and will be initially released by this pinion, so as to discriminate as to which is the correct total of a calculation covering up the incorrect one.

Figure 6:
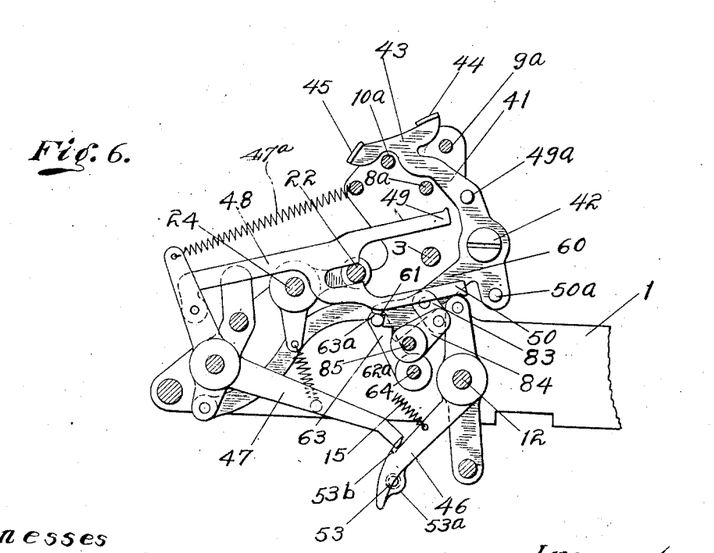
Fig. 6 is a detail right side elevation of the shutter mechanism, with same in neutral position.
Figures 8, 9:
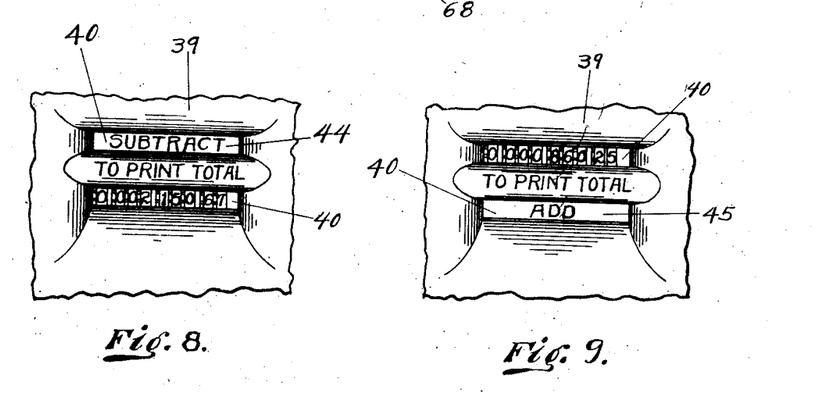
Fig. 8 is a plan view of apertures in the case, showing the positive dials and the shutter over the negative dials.
Fig. 9 is a plan view of the apertures in the case, showing the negative dials and the shutter over the positive dials.

Across the main frame (Figs. 8 and 9) is a covering 39, not shown in the other views, which covers up all but the portion of the dials which is to show the proper amount of a calculation, said covering having slots 40 at the center and having a cross strip which lies between the two sets of dials having printed on it the words "To print total." The shutter lies beneath this covering and has at its left end a member 41 pivoted to stud 42 on the side of the carriage (Fig. 6), said member terminating in a fork 43 which carries two strips 44, 45. The rearward strip 44 bears the word "Subtract" and the forward the word "Add." A bell crank 46 is provided, similar to the carry bell cranks already described, and operated from the left hand counter pinion in a similar manner to said other bell cranks. The bell crank 46 releases a bell crank 47, spring-pulled at 47ª, similar to the bell cranks 17 that were described as carrying the carry forks of the carry mechanism, which said bell crank has pivoted to it the fork 48 having tines 49 and 50. This fork is mounted on the grooved shaft 22 as are the carry forks, and is shifted up or down thereby.

Leaving out of consideration a second latch to be described below, when the subtract key (not shown as stated) is in operation and the grooved shaft 22 up, then the carry tooth of the terminal counter pinion releases the shutter fork and the fork will be thrown into contact with the pin 49ª on the end of the shutter member 41 above its pivotal center, and throw the shutter rearward, resulting in covering up the forward or adding set of dials with the cross strip that says "Add." This will notify the operator that if he wishes to print the correct total, he should add the amount shown on the negative dials which are then exposed.

Should the subtraction key be not depressed, the fork in throwing over will contact with the lower pin 50ª on the shutter member 41, resulting in covering the negative dials and informing the operator to subtract the amount shown on the positive dials to print the correct total.

Figure 11:
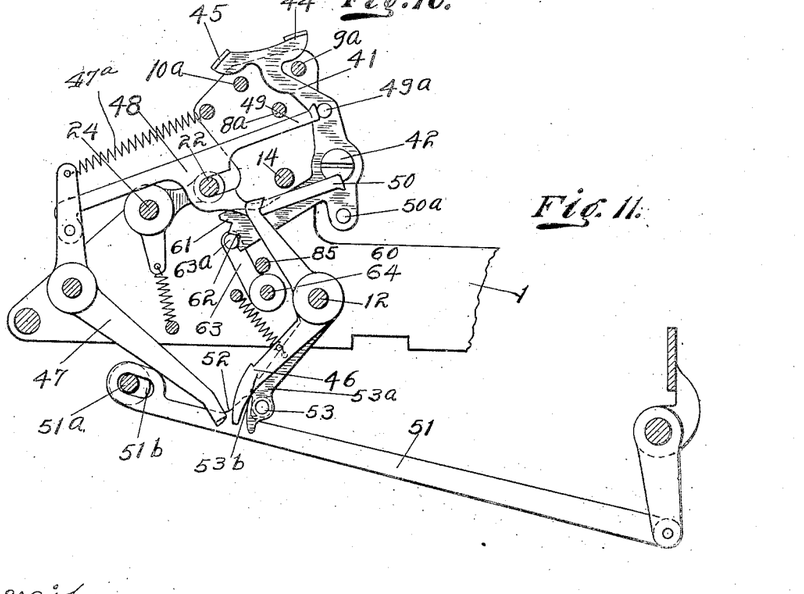
Fig. 11 is a detailed view of the shutter detaining mechanism and release, at the left of the carriage.

A second latch is provided to prevent the shifting of the shutter until the carriage has reached the end of its movement to the left after any registration. A reciprocating rod 51 is connected up to the carriage release in any desired manner, so as to be pushed forward whenever the carriage is released and when the carriage reaches a position with the units counter in mesh with the master wheel, to release the second latch. This rod carries a hook 52 which will hold the stud 53 on the latch 53ª until said rod is pushed forwardly, thereby preventing the spring throw of the shutter shift until the conditions above stated have been followed out, by means of its notch 53ᵇ engaging under the end of the bell crank 47 (Fig. 11).

When a value key is depressed, with the carriage at units position, the movement of the key will release the latch, during the turning of the units counter pinion.

If the dials are started out at normal, and say 30 is subtracted, the counter pinion will turn the positive tens dial to 7 and the negative tens dial from past zero to 2. The units dials will be unaltered, but other things not considered as will appear later, the reversal of the counter pinion will result in a carry of one from the tens to the hundreds counter when the tens counter pinion passes from 0 to 9 position. Thus all the nines in the negative column will be eliminated and the positive column will read all nines where there were zeros. Result—positive—99970; negative—00020, which is ten too small. In clearing the zeros in the negative column, however, the shutter was shifted, and means are provided to add ten to the minus side when this shift takes place.

*Shutter addition device.*

Figure 7:
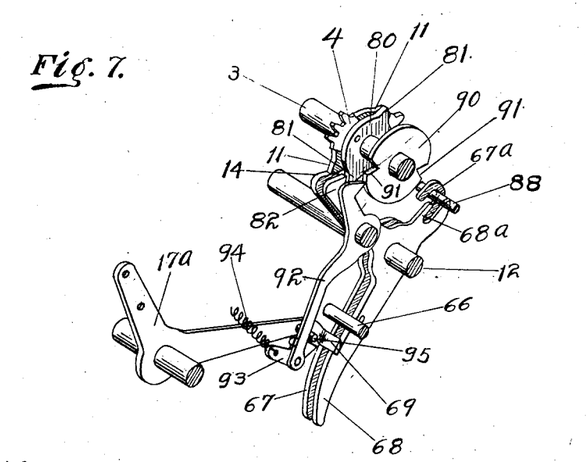
Fig. 7 is a perspective view of the mechanism to add or subtract 10 into the machine, when passing zero with either set of dials.

Forwardly extending from the shutter member at its supporting stud 42 on the left, is an arm 60, which is provided with notches 61, 62, at its forward end. A lever 63 (Fig. 4) carries a pin 63ª, and this lever is held in a position with this pin in engagement with one or the other of the notches by a proper spring 63ᵇ (Fig. 1). This spring-pressed lever 63 is mounted fixedly on the shaft 64, which is rotatably mounted between the side plates of the carriage. At the other end of the rock shaft 64 is an arm 65 (Fig. 1), provided with a pin 66 at its lower end. This pin contacts with two carry latches 67 and 68 (Figs. 1 and 7), which in turn retain the bent end 69 of a fork carrying ball crank 17ª for adding or subtracting one to or from the tens counter pinion. Two notches 61 and 62 are provided so that when shifting the shutter, the pin 63ª will move from one to the other, and will lock the shutter until the next shift. The raising of the pin 63ª out of either notch will result in releasing the carry latches 67 and 68.

Thus when the shutter shifts, leaving out of consideration other mechanism to be described, the tens counter pinion will be released, and the fork controlled by it will turn the tens counter pinion one way or the other dependent on the position of the grooved shaft 22 carrying the forks, as heretofore described. So in the calculation above noted, the negative dials would note 30 instead of 20, which would be correct, and the concealed positive dials would show 60 instead of 70.

Now if there were no other mechanism, and five were subtracted, the units counter pinion would reverse by the steps 9, 8, 7, 6 to 5, and in doing so would shift the carry mechanism between 0 and 9, thereby adding 1 to the tens wheel of the negative dials, resulting in 45 instead of 35, which would be incorrect. The positive dials would be 9999—955.

This error was due to the fact that in reversing on the counter pinions, there was a carry between 9 and 0 which ought not to be the case in operating on the negative dials.

*Negative carry regulator.*

The carry latch 67 is the regular carry latch controlled by the units counter pinion, said pinion having a disk secured thereto, said disk having teeth 11 spaced apart by ten spaces. There is also another disk 80 similar to that bearing the teeth 11 extending from the right side of the said units counter pinion. This disk has two teeth 81, 81, which contact with the hook 82 on the latch 68. The teeth 81, 81 are placed on the disk 80 in what would be the position between 0 and 1 on the units dial. Thus I provide two carry latches for the units counter pinion, both of which are thrown by the movement of the shutter, but which so far as now described would work independent of each other, and prevent any carry at all when under normal operation without movement of the shutter. Accordingly I provide mechanism to regulate the joint movement of these latches so that when operating on the positive dials, they will both work between 9 and 0 and when operating on the negative dials they will work between 1 and 0, on the positive dials, supposing them to be the determining factor of the counter pinions and bearing in mind, of course, that these counter pinions have no numbers on them and reference to numbers is to those dials affected by the pinions.

Figure 4:
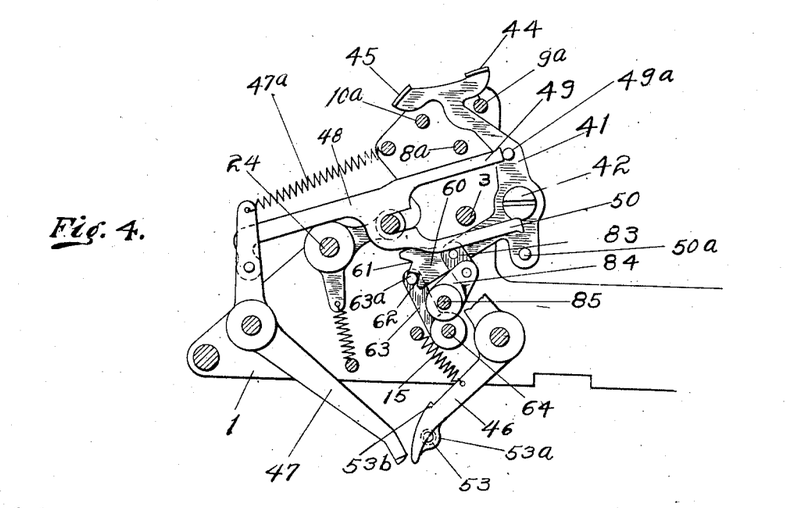
Fig. 4 is a cross sectional view of the mechanism to shift the shutter, the same being in rearward position to show a negative total.
Figure 5:
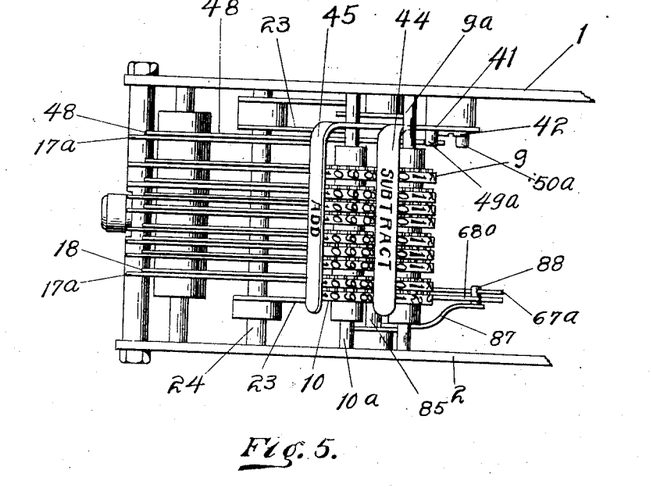
Fig. 5 is a plan view of the mechanism with the dials and shutter in place, and the dials cleared.
Figure 10:
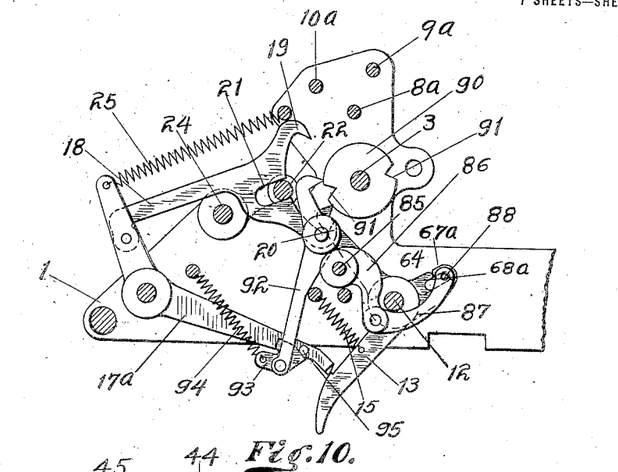
Fig. 10 is a detailed view of the mechanism to add 10 or subtract 10 into the machine.

The arm 60 which extends forwardly from the shutter has a link 83 pivotally mounted on it, and this link is pivotally secured to an arm 84 (Fig. 4). This arm 84 has fixed connection with a rock shaft 85. This rock shaft extends across the carriage and at its end adjacent to the units pinion has an arm 86 (Figs. 1 and 10), which carries a pivotal link 87. The link extends rearwardly, and a pin 88 thereon lies in between the special shaped hooks 67ᵃ and 68ᵃ of the two latches 67 and 68 respectively.

It can be seen that the movement of the shutter to positive or negative will control the position of the series of interconnecting members 83, 84, 85, 86 and 87 above noted, and that when the shutter is thrown rearwardly to negative position, the grooved shaft 22 being raised, the shaft 85 will be rocked so as to move rearwardly the link 87 and cause its pin 88 to engage clear under the hook 67ᵃ and over the top of the unhooked end of the additional latch 68.

In such a position, the actuation of the latch 68 by the 0-to 1 carry disk teeth, will result in raising the rear end of the latch 68 and likewise in raising the rear end of the latch 67 by means of the hook 67ᵃ thereon and the pin 88. The raising of the normal 9 to 0 carry latch will not affect the latch 68 and no carry will result as the latch 68 will hold the carry fork bell crank against movement.

When the grooved shaft 22 which carries the fork that shifts the shutter is lowered, as in the add position of the machine, and the shutter is shifted, then the pin 88 will be thrown into such position that the raising of the disk-affected latch 68 will not affect the normal latch 67, and thus the shifting of the latch 68 will not bring about any carry.

In the last calculation, therefore, there would not be any borrowing of one between 9 and 0, and the result would have stood on the negative dials 35 and the positive dials 99999,65 which would be correct.

Now suppose 62 were added to the machine when the dials were as now stated. Then the positive dials would stand 000002 when the tens dial was actuated, and when the units dial was reached, the shutter would shift and change the 2 to 3, which would be incorrect. The units dial would stand at 7, giving a result of 37. It is thus evident that means to prevent the shutter from adding on ten unless the result would stand at 0 in the units column should be provided, because the negative carry regulator will have compensated for the lost ten units. For this purpose I provide the following device.

*Shutter carry control.*

A disk 90 (Fig. 7) is secured to the units wheel, said disk having two notches 91 spaced ten apart as usual. A bell crank 92, having a tooth at its upper end to engage in these notches, is provided with a latch 93, which is pivoted to the bell crank and is held by a spring 94. This latch will prevent the tens fork carry bell crank from falling unless the tooth of the bell crank 92 is in one of the notches, because it will contact with a pin 95 on this tens carry bell crank. It will be in the notches only when the units counter pinion is at any position corresponding to zero on the dials, and therefore there will be no carry when the shutter shifts unless such is the position of the units counter pinion.

It will be particularly noted in this device that it is of the visible adding machine type and that the shutter serves to obscure from sight the set of dials which is beyond its zero position in the wrong direction. It will be noted also that the shutter automatically maintains correct the dials that are visible, said dials starting ten units apart.

It is not novel to start the adder and subtractor mechanism, one unit apart, and then to add on one unit when it is desired to print a negative result in adding machines. The shutter device could do this work in a machine where it was desired to add one unit only as well as it could when ten units are to be added. As will be now explained, it was not practical in this machine to allow for reverse movement of the dials for the negative transaction by borrowing one unit from the unit negative dial, in advance. If this was done, the shutter would have to add or subtract a unit from the units dial, after its operation by a units number key, and as will be described the grooved shaft that holds the shutter actuator fork and the carry forks is so controlled as to be returned to an intermediate position as soon as the units counter has been operated. Thus there would be a very small margin of time for the shutter to add on the unit, before its position was thrown to neutral.

Figure 2:
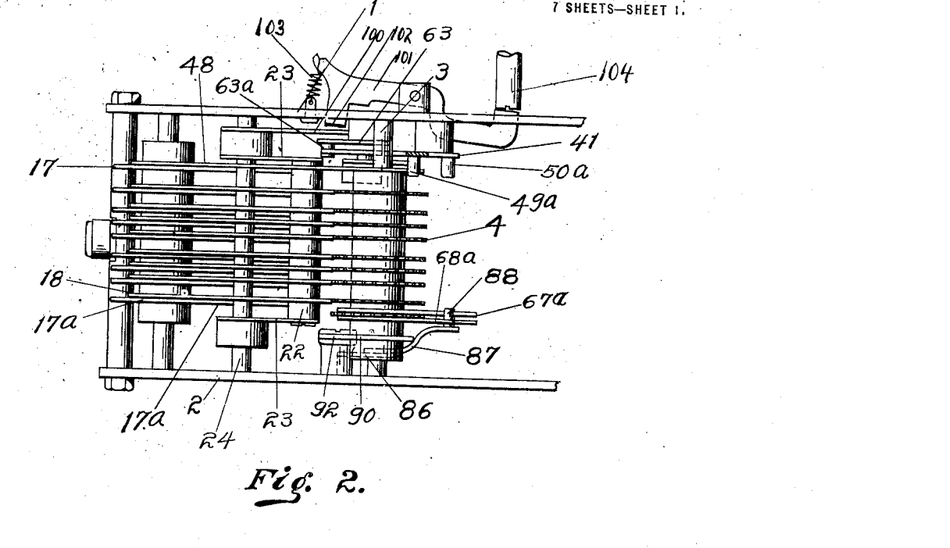
Fig. 2 is a plan view, with dials and part of the shutter removed.
Figure 3:
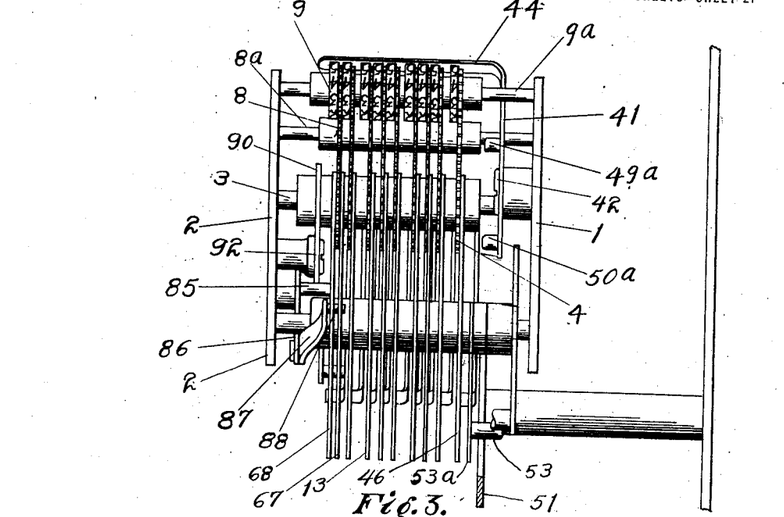
Fig. 3 is a rear view of the mechanism.

It was noted at the beginning that the grooved shaft i. e. the shaft 22 (Figs. 2 and 12) was swung one way or another by an order key 33 dependent upon the position of a subtraction device. Mechanism is provided, as in my former application to which reference has been made, to lock the grooved shaft in place once the order key that sets over the carriage for the listing and adding of an item has been depressed.

This mechanism comprises an arm 100 that extends parallel with the carriage from the rock shaft 24 that controls the grooved shaft for the various forks. Mounted on the outside of the left side plate 1 of the carriage is a pivoted latch 101 having an inwardly projecting finger 102 which lies across the path of the arm 100, and is held in such position by a spring 103. This latch has an outwardly projecting finger 104 which is adapted when the carriage is over to the left, at the step beyond the units column, to strike the body of the machine and remove the end 102 from the path of the latch arm 100, allowing it to drop to neutral position under proper spring pressure.

This mechanism, as has been stated, was fully described in my said former application, and it is now plain that the grooved shaft 22 will not be stationary after the carriage has passed beyond the units adding point. Therefore the necessary drop in the reverse numbered negative dials cannot be made at the units dial, because the compensating would have to be made after the carriage had passed the units point.

It will be noted further that my mechanism described of the negative carry regulator is used only on the units counter, and that all the negative dials except the units dial are set initially at 9, whereas all the adding dials are at zero. I prefer to arrange for resetting all the 9's on the negative dials to zero by adding ten into the machine whenever the minus total becomes greater than nothing, and regulate the negative and positive carriers on the units carry latch. If all of the carry latches were in like manner regulated, there would be no need of setting the negative dials, one behind the positive all along the line, and they could all begin at zero. This would entail more complication of mechanism and accordingly I have employed, shown and described but one of these.

It is desired that the claims that follow have within their scope, where such is possible, the full range of equivalent structure, although they have not been mentioned specifically during the description of parts herein.

In view of the fact that operation and construction have been dealt with simultaneously in the above specification, it is not believed to be necessary to add any further exposition of the operation of the machine.

Having thus described my invention, what I claim as new and desire to secure by Letters Patent, is:—

1. In a device of the character described, mechanism for actuating a counter system, means for maintaining a positive and a negative total, one of which is always correct, means for selecting the proper total, said total maintaining means initially arranged ten units apart, and said selecting means adapted to correct said error of ten units.

2. In a device of the character described, in combination with a movable carriage, mechanism for actuating a counter system, means for maintaining a positive and a negative total, one of which is always correct, and means for automatically selecting the proper total for any calculation, said means actuated from the terminal of the counter system and controlled in its operation by the carriage movement.

3. In a device of the character described, a set of elements for positive transactions, a set of elements for negative transactions, said elements at a different initial position of ten units, and common actuating means for said elements in constant operative connection therewith, carry mechanism therefor and means for automatically actuating said mechanism to correct a total when required.

4. In a device of the character described, a set of elements for positive transactions, a set of elements for negative transactions, a set of counter devices for simultaneous operation of said elements, and means for selecting the proper set of elements to give the result of any calculation, said negative elements set at a different initial position from the positive element of ten units, a carry mechanism for said elements, and means for operating said mechanism by the selecting means.

5. In a device of the character described, a set of elements for positive transactions, a set of elements for negative transactions, a set of counted devices for simultaneous operation of said elements, and means for automatically selecting the proper set of elements to give the result of any calculation, said negative elements set at a different initial position from the positive element of ten units, a carry mechanism for said elements, and means for operating said mechanism by the selecting means.

6. In a device of the character described, in combination with elements for providing a positive and a negative total, a single set of counter elements therefor having double carry points, carry mechanism for said counter elements having duplicate members and means for controlling the said members for selected counters thereof so as to carry at a different point when working on a negative total than when working on a positive total.

7. In a device of the character described, in combination with a single set of counters for simultaneously operating a positive and a negative totalizing device, duplicate carry mechanism for the counters, and means for controlling the carry mechanism for a selected portion of the operating device, so as to carry at a different point when working on a negative total than when working on a positive total.

8. In a device of the character described, in combination with a counter device and carry mechanism therefor, means for reversing the carry mechanism for negative transactions, means for placing said reversing mechanism in neutral position after operation of the units counter member of said counter device, and means for displaying two sets of numerals operated by said counter device, said means set so that the numerals of each set are ten units apart in the number displayed thereon, for the purpose described.

9. In a device of the character described, in combination with a counter device and carry mechanism therefor, means for reversing the carry mechanism for negative transactions, means for placing said reversing mechanism in neutral position after operation of the units counter member of said counter device, and means for displaying two sets of numerals operated by said counter device, said means set so that the numerals of each set are ten units apart in the number displayed thereon, and means for adding ten to the counters when either set of numerals passes zero position, during the operation of the units counter, whereby the neutralizing of the carry mechanism does not interfere with the adding of ten into the machine.

10. In a device of the character described, in combination with a counter device and carry mechanism therefor, means for reversing the carry mechanism for negative transactions, means for placing said reversing mechanism in neutral position after operation of the units counter member of said counter device, and two sets of number dials operated by said counter device, said dials set so as to be ten units apart in the number displayed thereon, and means for adding ten to the counters when either set of dials passes zero position, during the operation of the units counter, whereby the neutralizing of the carry mechanism does not interfere with the adding of ten into the machine, a shutter, said means for adding ten being connected to the shutter to simultaneously conceal the wrong set of dials when the ten is added.

11. In a positive and negative total machine, means for displaying sets of numerals for positive and negative transactions, a common operator for said means and a carry mechanism therefor, said sets of numerals arranged ten digits apart, means for compensating for the ten when shifting from one form of transaction to the other, said means operable only when the units numerals are both at zero, and means for shifting the carry point for negative transactions from the units operator.

12. In a positive and negative total machine, a counter pinion, two carry points therefor, a numeral dial operated thereby, duplicate carry levers and means for controlling which of said carry levers is to be operable dependent upon whether a positive or negative total is in the machine.

13. In a positive and negative total machine, means for indicating positive and negative transactions, the same being set ten units apart, and means for automatically correcting the error of ten units when changing the nature of total.

JOHN P. HARRISON, Jr.